(12) United States Patent
Aaltonen et al.

(10) Patent No.: US 6,228,148 B1
(45) Date of Patent: May 8, 2001

(54) METHOD FOR SEPARATING PARTICLES FROM AN AIR FLOW

(75) Inventors: Rami Aaltonen; Juha Leimu; Petri Norri, all of Turku (FI)

(73) Assignee: Velmet Corporation (FI)

( * ) Notice: Subject to any disclaimer, the term of this patent is extended or adjusted under 35 U.S.C. 154(b) by 0 days.

(21) Appl. No.: 09/314,030

(22) Filed: May 19, 1999

(30) Foreign Application Priority Data

May 26, 1998 (FI) .......................................... 981169

(51) Int. Cl.$^7$ ................................. B03C 3/78; B03C 3/80
(52) U.S. Cl. ........................ 95/74; 55/431; 95/75; 95/78; 96/44; 96/50; 96/61; 96/97; 96/228
(58) Field of Search .................... 96/61, 48, 50, 96/44, 97, 45, 228; 95/68, 78, 74, 75; 55/430, 431, DIG. 38

(56) References Cited

U.S. PATENT DOCUMENTS

| 3,492,790 | * | 2/1970 | Ebert | ....... | 96/48 X |
| 3,988,128 | * | 10/1976 | Hogg | ....... | 96/50 X |
| 4,388,089 | * | 6/1983 | Reif et al. | ....... | 96/45 |
| 4,689,951 | * | 9/1987 | Polach | ....... | 96/61 X |
| 5,855,652 | * | 1/1999 | Talley | ....... | 95/75 X |

FOREIGN PATENT DOCUMENTS

| 533 036 | 9/1931 | (DE) . |
| 858 692 | 12/1952 | (DE) . |
| 1428183 | 3/1976 | (GB) . |
| 105012 | 7/1942 | (SE) . |

* cited by examiner

*Primary Examiner*—Richard L. Chiesa
(74) *Attorney, Agent, or Firm*—Nixon & Vanderhye P.C.

(57) ABSTRACT

A method and an apparatus for separating solid or drop-like particles from an air flow is provided. The air flows through a separator chamber between an electrode, ion generating means or like particle charging device disposed in the separator chamber, and a grounded collector surface, so that the particles are charged by the charging device and accumulate on the collector surface. The air flows along a substantially spiral path around the charging device in at least a part of the separator chamber so that due to the action of centrifugal force at least a portion of the particles pass toward the grounded collector surface at the periphery of the chamber. A small flow of purified air flows downwardly in a central part of the separator chamber so that it washes the charging device in the separator chamber.

12 Claims, 4 Drawing Sheets

METHOD FOR SEPARATING PARTICLES FROM AN AIR FLOW

BACKGROUND AND SUMMARY OF THE INVENTION

The object of the present invention is a method and an apparatus according to the introductory parts of the independent claims presented below for separating solid or drop-like particles from air flows to be purified.

Then the invention relates particularly to a method and an apparatus where particles are separated from an air flow or a corresponding gas flow in a separator chamber or similar, by electrically charging the particles to be separated, e.g. by conventional high voltage techniques or ionisation, and by separating these electrically charged particles with the aid of a grounded collector surface or similar. Typically the separation occurs in an elongated cylindrical chamber, where at one end there is formed an air flow inlet and at the other end there is formed an outlet for the purified air flow which is separated from the particles. The electrode, ion generating means or similar which charges the particles is typically arranged in the central part of the separator chamber, so that it extends generally from the air flow inlet end to the purified air flow outlet end.

In conventional separators based on the electrical charge of the particles, as well as in electrical filters, the aim has been to obtain as low air flow velocities and as little turbulence as possible, so that the dust particles can be separated from the air flow in a smooth and controlled manner, and so that they are prevented from re-mixing with the air flow. The air flow is typically directed to the separator chamber via an inlet opening at the centre at one end of the chamber, and then the air flow is allowed to pass smoothly in the axial direction through the separator chamber, whereby the air flow and the separated particles uniformly fill the whole chamber, both at the centre and in the peripheral regions. Such conventional purification equipment must be made relatively large in order to provide the desired purification effect.

In conventional separators particles are separated from the air to be purified on all separator surfaces being in the way of the flow, both on the electrodes, on the structures supporting the electrodes and on the isolators arranged between the electrodes and the grounded collector surfaces. The particles accumulated on the surfaces will easily cause blockages which interfere with the free air flow through the separator chamber. On the other hand, piles of dry particles accumulated on the surfaces may from time to time begin to move again, as dust clouds, and form dusty air mixtures which impair the desired purification result. Further, layers accumulated particularly on the isolators may cause a short circuit between the electrodes and the grounded collector surfaces, which interferes with the operation of the isolator. Thus, due to the particles accumulated on the surfaces, the manageability and control of conventional purification equipment has often been difficult.

In addition to the small dust particles the air flow to be purified which flows through the separator chamber can sometimes also contain large particles or bodies which, when they hit the electrodes and stick to the electrode support structures, can both damage the structures and cause blockage.

Previously it has been proposed to use water spraying to wet the dust particles and bind them to each other in order to provide a better separation. However, the water will evaporate relatively rapidly from the moistened dust fog, and thus this wetting has not provided the desired result.

The American patent publication U.S. Pat. No. 4,388,089 presents an improved separator into which the gas to be purified is supplied in the tangential direction from above, so that the gas is made to pass through the separator in a generally spiral path around a smooth and simple wire electrode on the central axis of the separator whereby the centrifugal force automatically directs a part of the particles toward the grounded walls of the separator. There is further arranged a water film on the separator walls which flows from the top downwards, and with this film the aim is to lead in a controlled manner the particles which have separated on the separator walls away from the separator, and another aim is to prevent the particles from being re-mixed with the gas flow.

The capacity of a separator provided with a simple wire electrode is relatively low. In the above described case the use of other more efficient electrodes is limited i.a. by the fact that particles are more easily accumulated on their surfaces, which causes above mentioned blockage problems, or that the electrical field in their central part can be so low that the dust containing air flowing downwards in the central part will pass through without being purified. Particularly when the gas flow to be purified is large it may be difficult to prevent the particles in the central part of the separator, and at a distance from the water film to follow the gas downwards into the purified gas discharge at the bottom of the separator. Already due to the gravity force the particles tend to propagate directly downwards.

The objective of the present invention is thus to provide a new method and apparatus which are better than the previously known, in order to separate particles from an air flow.

The objective is to provide a method and an apparatus, where particularly the above mentioned drawbacks are minimised. Then an objective is particularly to provide a method and apparatus which minimise the accumulation of particles separated from the air flow on the electrodes, on the structures supporting the electrodes and on the isolators, and which minimise the problems caused by the accumulation.

An objective is to provide a method and an apparatus which enable the use of effective electrodes for charging the particles in the separator.

In order to achieve the above mentioned objectives the method and the apparatus according to the present invention are characterised in what is presented below in the characterising clauses of the independent claims.

The invention is particularly well suited for separating solid and drop-like particles from air flows to be purified in connection with the manufacturing of paper, paperboard, pulp or similar.

In a typical solution according to the invention the air flow to be purified is arranged to travel along a spiral path through an elongated vertical separator chamber, from an inlet at its bottom end to an outlet at its upper end, whereby the separator chamber acts as a separator where both electrical forces and the centrifugal force act on the particles and direct the particles toward a grounded collector surface at the periphery of the chamber. The collector surface is typically formed by the wall of the separator chamber, and the wall is grounded.

A typical separator according to the invention comprises a vertical cylindrical separator chamber, into whose central part an elongated electrode, ionising means or similar means with an open structure is arranged axially, which means can electrically charge the particles to be separated. The most different such electrodes can come into question where the electrode's horizontal open section has a large area, preferably over 90%. The electrode can be formed for instance of vertical wire electrodes or similar which are placed adjacent each other at short mutual distances in the form of a circle, of a net formed by wire electrodes which is bent into the shape of a cylinder, or of a smooth narrow cylinder, which is provided with sharp points or pins which initiate the discharge.

According to the invention the air flow to be purified is arranged to travel around an electrode or similar along a spiral path directed upward from the bottom. Then particles are separated from the air flow when they are exposed to the action of the centrifugal force and/or when they are electrically charged and directed toward the walls of the separator chamber. In a preferred solution according to the invention the air flow is arranged to pass spirally upwards along the walls of the separator chamber, so that the particles or bodies in the air flow will pass over the electrodes, the structures supporting the electrodes and the isolators, mainly without touching them.

Further, a continuous water film or water skin is preferably arranged in the separator chamber so that it flows along the walls of the chamber and immediately binds the dust particles or other particles when they contact the water. The turbulence occurring in the spirally upwards flowing air flow furthers the particles coming into contact with the water film, whereby even a minor water film flowing along the walls is enough to bind the dust. The particles brought into contact with the water film are wetted and bound to the water film, and cannot again mix with the air flow and form harmful dust-air mixtures. The water film flows downwards and moves the impurities stuck to it into the lower part of the separator chamber and discharges them from the separator.

The rotary motion of the air flow in the separator chamber results in that the main part of that air flow which is brought into contact with the electrodes, with the structures supporting the electrodes and with the isolators, is relatively clean and will not cause substantial accumulation of dirt on the structures. With the solution according to the invention it is possible to ensure that the electrodes and other surfaces at the centre of the separator chamber will be kept clean by creating conditions in the central part of the separator chamber around the electrode surfaces or similar for a downward directed flow of clean gas which washes the electrodes. The electrodes or electrode surfaces are designed with such a structure that they do no substantially hinder the gas flow at the region of the electrodes, but enable the clean gas to flow in the central part of the separator from the top of the separator chamber downwards. The clean gas can flow almost straight downwards, or in a small spiral downwards. In the solution according to the invention we have surprisingly realised to utilise the fact that in a separator where the supplied gas is brought to flow spirally upwards there is formed at the centre of the spiral flow a downward directed flow of clean gas, as far as there is arranged an open space for the clean gas flow in the central part of the separator. In the solution according to the invention the open space is arranged in the central part of the separator by arranging at the central part of the separator such electrodes which have a cross-section which is as open as possible, which in other words causes as little hindrance to the flow as possible. In the case according to the invention the open area of the electrode area is preferably over 90%.

Thus in the solution according to the invention it is ensured that the electrodes are kept clean by arranging an air flow in the separator chamber so that at the centre of the spirally upward flowing air flow between the electrode or similar and the wall of the separator chamber we allow the generation of a smaller downward directed flow of clean air. The downward flowing clean air washes the surfaces of the electrodes arranged in the central part of the separator chamber and removes any particles accumulated on them, and directs these particles downward to the particle discharge and/or directs them outward toward the spiral air flow where the particles will be subject to a new separating process. The flow of clean air is less than 30% of the air flow to be purified. Often a substantially smaller clean air flow is sufficient to keep the electrode surfaces clean.

In order to ensure the open area the electrodes can preferably be made of wire electrodes by arranging them at short mutual distances, or by bending them into electrode assemblies with a desired form, for instance a net form, however, leaving space between the electrode surfaces for the gas flow, or by forming sharp points or pins of the electrodes which are fastened to the support structure at the centre of the separator.

The spiral flow of the air to be purified is provided for instance by supplying the air flow in a tangential direction into the separator chamber from an inlet at the bottom part of the chamber. On the other hand the air flow can also be supplied axially from an inlet opening or channel arranged at the centre of the chamber when one or more blades or similar are arranged in the opening or channel, whereby these blades bring the air flow to pass along a spiral path in the chamber around the imaginary axis of the chamber.

The air flow is supplied into the separator from its lower part so that the air flow rotates against the internal surface of the cylinder. The air travels in a screw motion from the inlet toward the outlet. The rotational motion ensures a stable flow and ensures the same retention time in the separator for the whole air flow. Any large bodies in the air flow will hit and stick to the wall of the cylinder acting as a collector surface immediately when they come into the separator, without causing any harm.

Due to the rotational motion of the air flow the distance which the air flow travels in the separator chamber is many-fold, typically 3 to 6 times, compared to the length of the separator chamber, or compared to the distance which the air flow travels in conventional separators operating with an axial flow.

BRIEF DESCRIPTION OF THE DRAWINGS

The invention is described in more detail below with reference to the enclosed drawings where.

DETAILED DESCRIPTION OF THE DRAWINGS

Figure 1:
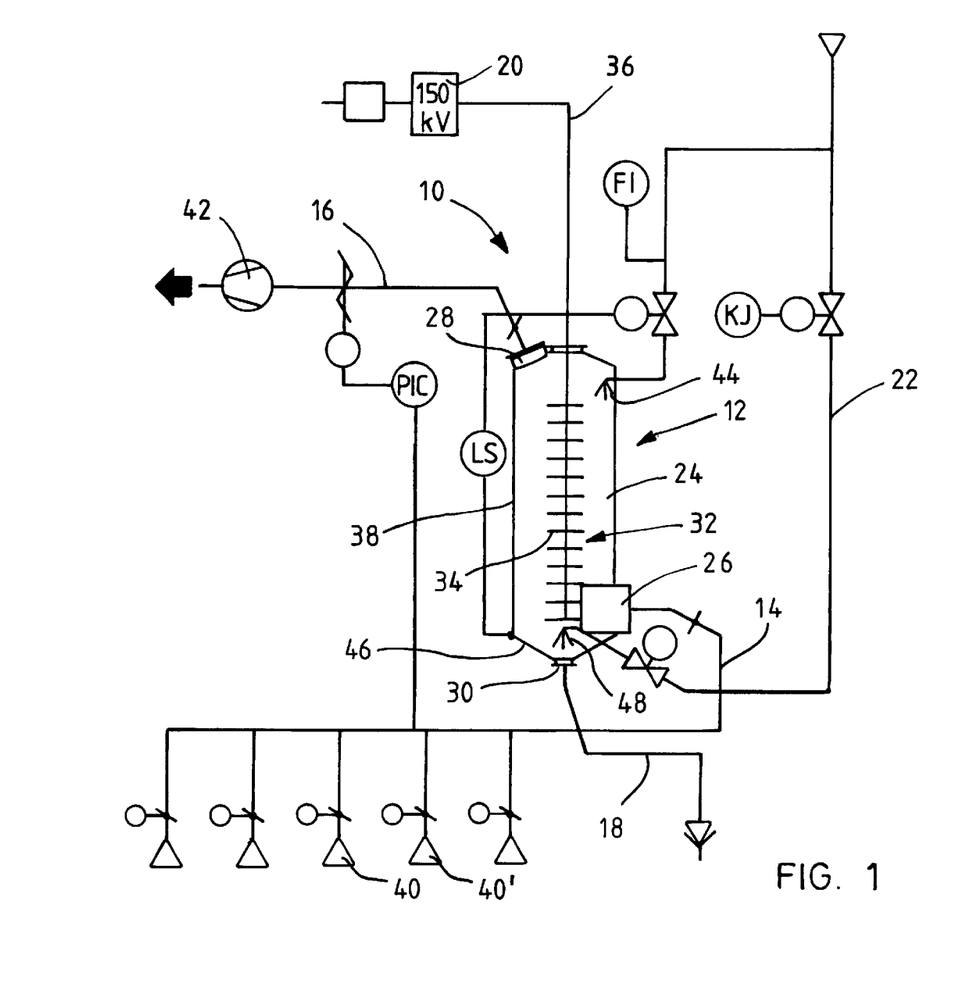
FIG. 1 shows as an example a diagram of a purification apparatus using a separator according to the invention.

FIG. 1 shows an air purification apparatus 10 arranged in connection with a paper machine, where dust particles are separated from the air by charging the particles electrically, by conventional high voltage techniques, by electrical ionising techniques, or some other corresponding technique. The air purification apparatus comprises a separator 12, inlet piping 14 for the air to be purified, discharge piping 16 for the purified air, discharge piping 18 for the separated particles, a power source 20, and spray water piping 22.

The separator 12, i.e. the actual air purifier, comprises a vertical cylindrical separator chamber 24, which has an inlet 26 for the air to be purified, an outlet 28 for the purified air, and a discharge opening 30 for the separated particles. The separator chamber has typically a height of 2 to 9 m, suitably 3–7 m, and a diameter of 0.5 to 3 m, suitably 1 to 2 m, and is generally a chamber made of stainless steel, with a maximal flow-through of about 0.3 to 10 m$^3$/s, typically 1 to 5 m$^3$/s.

In the central part of the separator there is arranged an electrode or ion generating means 32, which comprises several consecutive sections 34, to each of which there is attached a plurality of points for generating a corona discharge. The electrode is connected to a power source 20 by a conductor 36, whereby the voltage of the power source is for instance 100 to 150 kV. The wall 38 of the separator is grounded, whereby an electrical field is generated between the electrode and the grounded wall, which field will charge the particles moving in the electrical field and bring the particles to move toward the wall.

Air to be purified is supplied to the separator from different locations 40, 40', for instance in a paper machine, such as from the wire section, from the drying section, from the slitter-winder and from the coating machine, so that the air is purified from i.a. water drops, fibrous pulp, additives and other dust. It is often necessary to remove dust, as well as water drops, from the air before it is reused or discharged to the environment. Also so called clean external air can be purified in a separator according to the invention. The air to be purified is conveyed through the separator with the aid of a blower 42 arranged in the discharge piping 16 for the purified air.

In the separator according to the invention shown in FIG. 1 the air to be purified is supplied in the tangential direction into the separator so that the air flows along a spiral path in the separator chamber 24 along its walls 38 from the inlet 26 at its lower part to the outlet 28 at its upper part. The air flow can be directed to the separator at a high velocity 10 to 20 m/s, typically 15 m/s, whereby the velocity of the air flow is substantially higher than the air flow velocity in conventional corresponding separators, where it is maximally 3 to 4 m/s, even less than 1 m/s. On the other hand the retention time of the air flow in the separator is generally as long as in the conventional separators.

Due to the tangential inlet, large particles in the air flow will hit the separator wall immediately at the lower part of the separator where they are separated from the air flow. Air and any smaller particles left in it will flow forward close to the wall 38 in the electrical field between the electrode 32 and the grounded wall 38. The particles in the air flow are charged in the electrical field, whereby the combination of the centrifugal force and the electrical field causes the particles to be separated from the air flow and their transport toward the grounded outer periphery of the separator, in other words its wall, and to stick to the wall. Because the air flow is directed to travel along the grounded wall, and because there are no other structures between the wall and the air flow, the particles separated from the air flow can very easily travel, either due to the centrifugal force or to the electrical forces or to their combined effect, so that they contact the grounded wall and stick to it. The purified air which is free of particles is discharged from the outlet 28.

The particles stuck on the wall 38 are removed by washing water jets 44 connected to the water piping 22, whereby the jets form a continuous water film flowing downward along the walls 38 and ensure that the particles are separated from the air flow. In the solution according to the invention it is not generally necessary that the air which contains particles and flows in the separator chamber is wetted with water jets or a water spray. The water is sprayed mainly directly toward the walls of the separator chamber where the water forms a water film which binds the particles to the wall. The water film and the particles in it are discharged from the separator through the opening 30 formed at the centre of the bottom 46 in the separator. The discharge of the particles from the bottom 46 of the separator can be made more effective by spraying from time to time water on the bottom, for instance during about 30 seconds in intervals of about 20 minutes, from spraying nozzles 48 which are located at the bottom and also connected to the water piping 22. In many cases it is possible to use white water as washing water.

Figure 2:
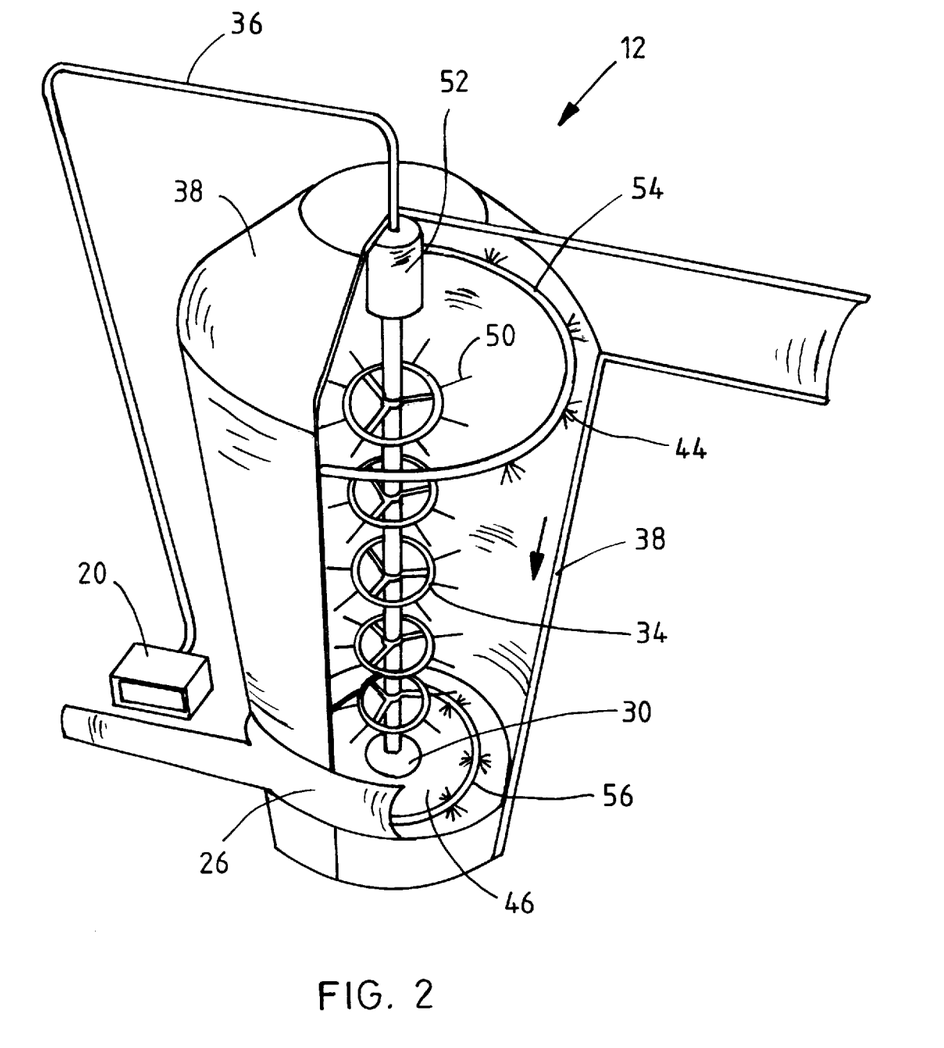
FIG. 2 shows schematically and partly opened an exemplary separator according to the invention.

FIG. 2 which uses the same reference numerals as FIG. 1 where applicable shows a typical separator according to the invention which is partly opened. Five electrode sections 34 are axially mounted in the separator, whereby the sections are formed by annular support structures mounted coaxially on the axis of the separator, and by a plurality of, for instance 4 to 20, radially arranged pin electrodes 50. Via a conductor 36 the electrode is connected to the power source 20 and a controller, not shown in more detail. The conductor is protected from the grounded wall structure 38 by an isolator 52.

The inlet 26 of the air to be purified is arranged on the periphery of the separator to direct the air to be purified in a tangential direction into the separator. In the inlet the air flow to be purified is brought into a spiral motion, whereby the particles in the air flow are directed toward the walls 38 of the separator and do not in any particular amount come into contact with the sections 34 of the electrode, which thus will stay clean and intact. Also the isolator 52 is kept free of particles, and there is no risk of sparking from the electrodes 50 via the isolator 52 to the grounded wall 38.

Washing water is sprayed on the separator walls from an annular water pipe 54 provided with spray nozzles 44 and arranged coaxially with the separator in the upper part of the separator. At the bottom of the separator there is also arranged an angular water pipe 56 from which washing water can be sprayed from time to time in order to direct the particles accumulated on the bottom 46 toward the particle discharge opening 30. In order to discharge the particles there is not necessarily required an angular water pipe at the bottom, but there may be arranged a required number of, for instance 3, separate water nozzles for the spraying of washing water.

Figure 3:
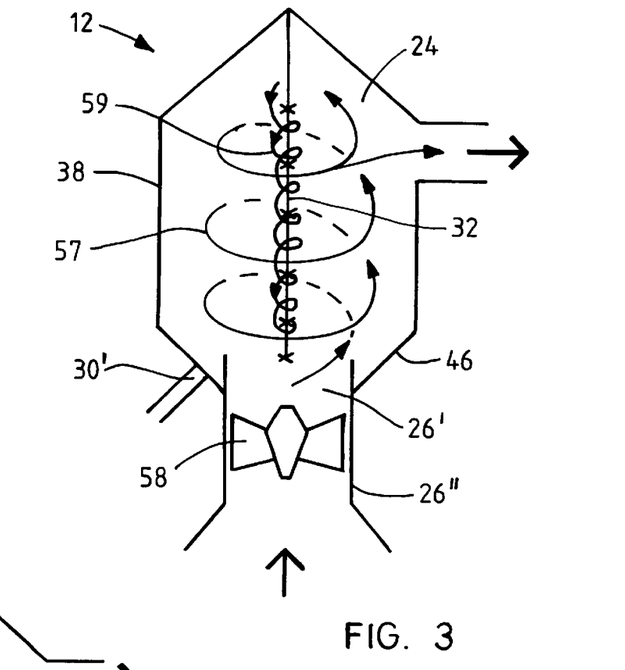
FIG. 3 shows schematically a cross-section of another exemplary separator according to the invention.

FIG. 3 shows another typical separator according to the invention for removing particles from an air flow. The same reference numerals as in the FIGS. 1 and 2 are used where applicable also in FIG. 3. In the separator chamber 24 of FIG. 3 the air inlet opening 26' is arranged axially at the centre of the bottom 46 of the separator. In order to bring the air flow into a spiral motion blades 58 are arranged in a channel 26" arranged in the inlet opening 26', whereby these blades bring the air flow into a rotary motion. Due to the blades the air flow in this separator will have a spiral form as in the separators presented in the FIGS. 1 and 2. In the separator 12 the air flow will move around the electrode 32 so that the particles will not generally come into contact with the electrode or with the structures supporting the electrode. In the solution according to FIG. 3 the particle discharge opening 30' is formed in the lower part of the separator wall 38 or in the bottom 46, i.e. adjacent the inlet opening 26' for the air flow.

FIG. 3 shows also the air flow 57 to be purified which is upwardly directed in a spiral flow, and from which particles are separated and transported toward the wall 38, due to the effect of either the centrifugal force or the electrical force. The FIG. 3 further shows, at the centre of the spirally upwardly flowing air flow which is to be purified, another substantially smaller clean air flow 59 which travels downward in a spiral flow, whereby this clean air flow washes the electrode 32 in order to keep it clean. The washing clean air flow is substantially smaller than the air flow to be purified, i.e. typically its volume is less than 30% of the air flow to be purified. The use of a washing air flow enables the use of many different effective electrode constructions as the air washing prevents dust accumulations on their surfaces. A similar electrode washing is advantageously arranged also in the apparatuses according to the invention shown in the FIGS. 1 and 2.

Figure 4:
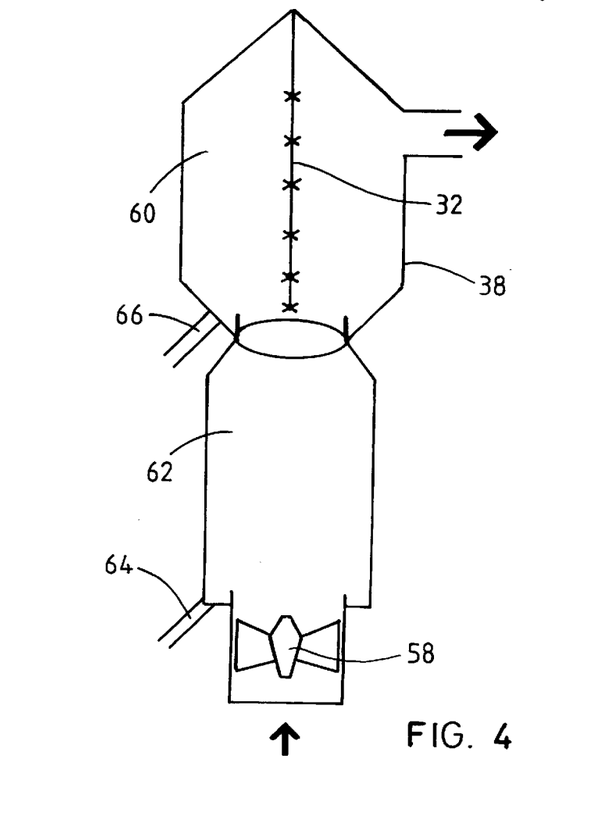
FIG. 4 shows schematically a modification of the separator according to FIG. 3.

FIG. 4 shows a separator 12 according to FIG. 3, however, now the separator has two sections 60, 62, so that the electrode 32 is mounted only in the upper section 60 of the separator, whereby the lower section 62 of the separator only operates as a centrifugal separator. Blades 58 are mounted in the inlet opening formed in the lower part of the separator, whereby the blades bring the air flow supplied to the separator into a spiral motion. Then in the lower section 62 of the separator particles which can be separated from the air flow by the centrifugal force are separated, and the smaller particles follow the air flow into the upper section 60 of the separator. In the upper section of the separator the smaller particles are separated electrostatically as the air flow travels between the electrode 32 and the grounded wall 38, as was described in connection with FIGS. 1 to 3.

In this case it is possible to arrange a separate outlet 64 for coarse particles in the lower section 62 and an outlet 66 for fine particles in the upper section 60 of the separator, whereby particles of different type can be separated from each other, which in some cases may be useful.

Figure 5:
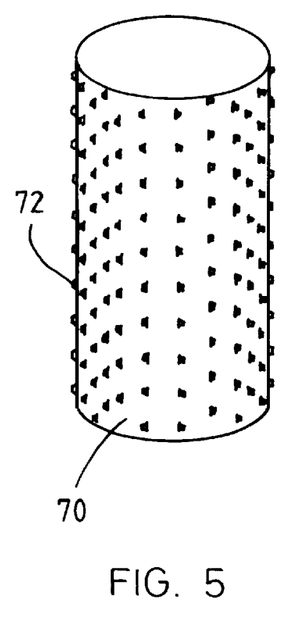
FIGS. 5 to 7 show schematically electrodes which are suitable for a separator according to the invention.
Figure 6:
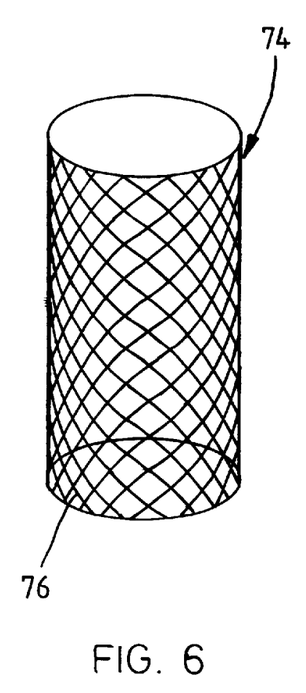
Figure 7:
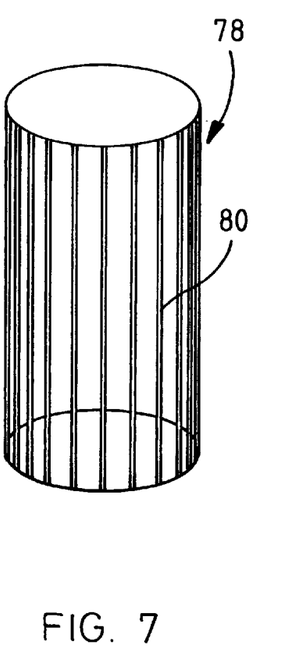

FIGS. 5 to 7 show different electrodes which conceivably can be used in a solution according to the invention. The cylindrical electrode of FIG. 5 is formed by a cylindrical surface 70, in which there are formed points 72 in order to create a corona discharge. The electrode 74 of FIG. 6 is formed of thin wire electrodes 76 combined into a net form. The net is bent into the form of a cylinder. The electrode 78 of FIG. 7 is formed by a number of vertical wire electrodes 80, which are connected adjacent each other on a cylindrical periphery so that they are axially directed. The electrodes have an open structure, so that they enable the use of a vertical washing air flow at the centre of the separator in order to keep the electrodes clean.

The advantage of the separator solution according to the invention compared to what is previously known can be seen i.a. in that
- a re-mixing of purified air and separated particles can be avoided when the inlet of the air to be purified is arranged at the lower part of the separator and the outlet of the purified air at the upper part of the separator;
- when the air inlet is arranged at the lower part of the separator the air to be purified and the water film flowing along the walls of the separator can be arranged to flow in opposite directions, so that the air which contains impurities in the lower part of the separator meets water which contains most impurities, and so that the purified air in the upper part of the separator meets clean water;
- more effective electrode solutions than simple wire electrodes can be use as electrodes when the air flow is arranged so that a small part of clean air flows axially downward in the central part of the separator and washes the electrodes, considering also that the capacity of the wire electrodes is relatively low; and that
- the use of larger electrodes enables the use of separators having a larger size.

The air flow purifiers according to the invention shown in FIGS. 1 to 4 operate effectively because they utilise a top-separator based on mass forces in combination with electrical separation. A separator according to the invention can provide a separation which is even higher than 99%, and which enables the purified air to be utilised also in demanding applications. A top-separator can by itself separate water drops having a size over about 100 microns. On the other hand, the separating capacity of a separator based on electrical separation reaches particles well below 1micron. Thus an apparatus according to the invention is intended to purify the most different impurities from the air flow or corresponding gas flow, including liquid drops and solid particles, with a wide particle size distribution range.

Due to the low pressure difference of the separator the energy consumption of the blower in an apparatus according to the invention is low compared to previous solutions. The energy consumption required for the electrical charging or ionisation in a typical separator according to the invention is maintained at a level of about 1 to 3kW. In a solution according to the invention the water consumption is also low, typically about 25 to 30 litres/minute, because water is not required per se for separating dust from the air, but only for removing the particles from the separator.

The invention is not intended to be limited to the exemplary embodiments presented above, but on the contrary, the intention is to apply it widely within the inventive idea defined in the enclosed claims.

What is claimed is:

1. A method of separating particles entrained in a gas from the gas, utilizing at least one charging device and at least one collector surface comprising:
   (a) causing the gas with entrained particles to flow in a substantially upwardly directed substantially spiral path past the at least one charging device and the at least one collector surface so that some particles separate from the gas as a result of centrifugal force, and so that some particles are charged by the at least one charging device and accumulate on the at least one collector surface, to produce at least partly purified gas; and
   (b) causing a portion of the at least partly purified gas to flow downwardly in a central portion of the substantially spiral path to wash the at least one charging device.

2. A method as recited in claim 1 wherein (b) is practiced so as to cause less than 30% of the at least partly purified gas to flow downwardly in a central portion of the substantially spiral path.

3. A method as recited in claim 1 utilizing apparatus comprising: a separating chamber having a particle-laden gas inlet at a first end, and an at least partly purified gas outlet at a second end, the first end lower than the second end, and air directing means which direct particle-laden gas in the chamber so that it flows in a substantially spiral path; the particle collector surface disposed in the chamber for collecting electrically charged particles; the particle charging device, which electrically charges particles entrained in gas flowing therepast, disposed in a central part of the chamber adjacent the substantially spiral path, and having an open structure allowing the flow of gas through a central portion thereof to allow gas flow interiorly thereof to wash the charging device; and the charging device comprising vertical wire electrodes arranged substantially in a circle, vertical wire electrodes arranged in a net form, a narrow cylinder having a plurality of discharge points, or a plurality of pin electrodes disposed radially on a support structure; and wherein (a) and (b) are practiced so that gas with entrained particles flows upwardly exteriorly of the at least one charging device, and at least partly purified gas flows downwardly interiorly of the at least one charging device.

4. A method as recited in claim 1 wherein (a) is practiced by introducing a flow of gas within entrained particles tangentially into the bottom portion of a separator chamber, to flow upwardly therein in a substantially spiral path around the charging device.

5. A method as recited in claim 4 wherein (b) is practiced so as to cause less than 30% of the at least partly purified gas to flow downwardly in a central portion of the substantially spiral path.

6. A method as recited in claim 1 wherein (a) is practiced by primarily axially introducing a gas with entrained particles into a separator chamber, and by providing at least one blade in the separator chamber to cause the air to travel in a substantially spiral path.

7. A method as recited in claim 6 wherein (b) is practiced so as to cause less than 30% of the at least partly purified gas to flow downwardly in a central portion of the substantially spiral path.

8. A method as recited in claim 1 wherein (a) is practiced by causing the gas with entrained particles to flow between the at least one charging device and the at least one collector surface.

9. A method as recited in-claim 8 wherein (b) is practiced so as to cause less than 30% of the at least partly purified gas to flow downwardly in a central portion of the substantially spiral path.

10. A method as recited in claim 1 further comprising continuously wetting the at least one collector surface in order to wet particles accumulated thereon.

11. A method as recited in claim 10 wherein (a) and (b) are practiced in a separator chamber having a discharge opening in the bottom thereof; and further comprising spraying the bottom of the separator chamber with water in order to direct particles accumulated on the bottom into the discharge opening.

12. A method as recited in claim 1 wherein (a) and (b) are practiced in a separator chamber having a discharge opening in the bottom thereof; and further comprising spraying the bottom of the separator chamber with water in order to direct particles accumulated on the bottom into the discharge opening.

* * * * *

UNITED STATES PATENT AND TRADEMARK OFFICE
CERTIFICATE OF CORRECTION

PATENT NO.   : 6,228,148 B1  
DATED        : May 8, 2001  
INVENTOR(S)  : Aaltonen et al.

It is certified that error appears in the above-identified patent and that said Letters Patent is hereby corrected as shown below:

<u>Title page,</u>  
Item [73], Assignee: change "Velmet Corporation" to -- Valmet Corporation --

Signed and Sealed this

Eleventh Day of June, 2002

Attest:

Attesting Officer

JAMES E. ROGAN  
*Director of the United States Patent and Trademark Office*